United States Patent
Vitaletti

(10) Patent No.: US 10,134,090 B2
(45) Date of Patent: Nov. 20, 2018

(54) CONFIGURATION OF A NETWORK PARTITION WITH ARRANGEMENT OF INTERCEPTING/REGULATING ELEMENTS BASED ON DISTRIBUTION OF RESIDUAL CAPACITY OF SOURCES TO PARTS

(71) Applicant: International Business Machines Corporation, Armonk, NY (US)

(72) Inventor: Marcello Vitaletti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 14/750,969

(22) Filed: Jun. 25, 2015

(65) Prior Publication Data
US 2016/0005119 A1 Jan. 7, 2016

(30) Foreign Application Priority Data
Jul. 3, 2014 (GB) .................................... 1411905.1

(51) Int. Cl.
G06Q 40/00 (2012.01)
G06Q 40/04 (2012.01)
G06Q 50/06 (2012.01)

(52) U.S. Cl.
CPC ............ *G06Q 40/04* (2013.01); *G06Q 50/06* (2013.01)

(58) Field of Classification Search
CPC ............................... G06Q 40/04; G06Q 50/06
(Continued)

(56) References Cited

U.S. PATENT DOCUMENTS

| 5,748,844 A | 5/1998 | Marks |
| 8,024,051 B2 | 9/2011 | Korobkov et al. |

(Continued)

FOREIGN PATENT DOCUMENTS

| CN | 103189725 A | 7/2013 |
| GB | 2410055 A | 7/2005 |
| GB | 2499113 A | 8/2013 |
| RO | 128440 | 5/2013 |
| WO | WO2012158218 A1 | 11/2012 |

OTHER PUBLICATIONS

Intellectual Property Office Patent Search Report, dated Jan. 5, 2015, regarding Application No. GB1411905.1, 3 pages.
(Continued)

*Primary Examiner* — Lalita M Hamilton
(74) *Attorney, Agent, or Firm* — Yee & Associates, P.C.; Michael O'Keefe

(57) ABSTRACT

A method, and associated system and computer program product, for configuring a network of interconnected sources and users of a commodity, the method comprises: providing a partition of the users into a plurality of disjoints parts; initializing a grouping of the sources and parts into a plurality of disjoint groups each one comprising one or more interconnected sources and parts; repeating selecting an enlarging group among the groups being over-supplied, selecting an adding part among the parts adjacent to the enlarging group being under-supplied, merging the adding part and the possible group thereof into the enlarging group, and updating the supply balance of the merged enlarging group and the residual demand of the parts thereof according to the merging until all the parts belong to a single group; and determining an arrangement of intercepting/regulating elements according to the conditions of the inter-part connections.

15 Claims, 8 Drawing Sheets

(58) Field of Classification Search
USPC .......................................................... 705/37
See application file for complete search history.

(56) References Cited

U.S. PATENT DOCUMENTS

| | | | | |
|---|---|---|---|---|
| 8,370,786 | B1* | 2/2013 | Burstein | G06F 17/5068 716/110 |
| 9,762,053 | B2* | 9/2017 | Nakahara | H02H 11/003 |
| 2013/0231876 | A1 | 9/2013 | Hanss et al. | |
| 2014/0012427 | A1* | 1/2014 | Katayama | G06Q 10/04 700/291 |
| 2014/0303787 | A1* | 10/2014 | Struckmeier | G06F 1/206 700/276 |

OTHER PUBLICATIONS

De Paola et al., "Optimal design of district metered areas in water distribution networks," 12th International Conference on Computing and Control for the Water Industry (CCWI2013), Sep. 2013, Procedia Engineering vol. 70, pp. 449-457.

Di Nardo et al., "A Design Support Methodology for District Metering of Water Supply Networks," Water Distribution Systems Analysis (WDSA2010), Sep. 2010, pp. 870-887.

Di Nardo et al., "A heuristic design support methodology based on graph theory for district metering of water supply networks," Engineering Optimization, vol. 43, No. 2, Feb. 2011, pp. 193-211.

Di Nardo et al., "An Automated Tool for Smart Water Network Partitioning," Water Resources Management, vol. 27, No. 13, Oct. 2013, pp. 4493-4508.

Perelman et al., "Water-Distribution Systems Simplifications through Clustering," Journal of Water Resources Planning and Management, vol. 138, No. 3, May 2012, pp. 218-229.

Vitaletti, "Partitioning of a Network Using Multiple Poles for Each Part Thereof," U.S. Appl. No. 14/687,623, filed Apr. 15, 2015, 45 pages.

United Kingdom Intellectual Property Office Examination Report, dated May 12, 2016, regarding Application No. GB1411905.1, 5 pages.

* cited by examiner

CONFIGURATION OF A NETWORK PARTITION WITH ARRANGEMENT OF INTERCEPTING/REGULATING ELEMENTS BASED ON DISTRIBUTION OF RESIDUAL CAPACITY OF SOURCES TO PARTS

CROSS-REFERENCE TO RELATED APPLICATIONS

This application claims the benefit of priority to United Kingdom Patent Application No. 1411905.1, filed Jul. 3, 2014, the entire contents of which are incorporated herein by reference.

TECHNICAL FIELD

The present disclosure relates to the data processing field. More specifically, this disclosure relates to the configuration of network partitions.

BACKGROUND

Networks of interconnected objects (known as nodes) are commonly used in a number of fields; typical examples are distribution networks of commodities (for example, water). The networks are often partitioned into smaller components (known as parts). For example, a large Water Distribution Network (WDN) may be partitioned into parts known as District Metered Areas (DMAs), or simply districts. This facilitates the localization of leakages in the water distribution network by monitoring a balance between an inflow and an outflow of each district, and it allows supplying each district at lower pressure (thereby saving energy for pumping the water and reducing the leakages); particularly, the districts may be designed to include users with a similar difference of their elevation with respect to the elevation of corresponding sources, so as to allow supplying the districts at a pressure that is only slightly higher than a Minimum Service Pressure (MSP) required by their users.

The process of partitioning a (large) network is quite challenging; this is mainly due to the inherent difficulty of the problem to be tackled, the variety of constrains to be satisfied and the complexity of the terms to be optimized.

For this purpose, a three-phase approach may be used; in this case, the partitioning process is divided into separate phases that are more tractable from a computational point of view. Particularly, in a first phase multiple candidate partitions are generated for the network, in a second phase the candidate partitions are configured, and in a third phase the candidate partitions are optimized (and one of them is then selected).

In this context, the most challenging activity is generally that of configuring the candidate partitions. For example, in a water distribution network this involves determining the arrangement of intercepting valves (for closing connections between different parts) and of regulating valves (for regulating the pressure of the water supplied from one part to another part) of each candidate partition.

An example of partitioning process for a water distribution network is described in "Optimal design of district metered areas in water distribution networks, Francesco De Paola, Nicola Fontana, Enzo Galdiero, Maurizio Giugni, GianlucaSorgentidegliUberti and Marcello Vialetti, 12th International Conference on Computing and Control for the Water Industry, CCWI2013" (the entire disclosure of which is herein incorporated by reference).

With reference in particular to the activity of configuring a specific partition, this document points out that in most cases the partition may have districts without sources (inner districts) or districts whose sources are not able to meet a total demand of its users; in order to supply these districts, connections with other districts are opened. For this purpose, a heuristic technique is described wherein all the districts are put into a set and taken into account in succession. If the sources of each (current) district are able to meet its total demand (i.e., it is supplied), the district is removed from the set. On the other hand (i.e., when the total demand of the district is not met, comprising for an inner district), if the district has no adjacent supplied districts it is skipped. Otherwise, the shortest paths to the users of this district from the sources of the adjacent supplied districts (not already connected thereto) are computed according to their hydraulic resistances (based on diameter, length and roughness of the corresponding connections). The connection between the two districts in the minimum shortest path is opened and a corresponding source is added, thereafter the district is removed from the set. The same operations are repeated until the set is emptied.

However, the selection of the adjacent supplied districts for supplying the other districts depends on the order by which such adjacent districts become supplied (which has no physical significance). Moreover, the capacity of the sources is not taken into account (so that there is no guarantee that the connections being opened are the most appropriate ones). In addition, hydraulic simulations may only be performed after completing the configuration of the partition.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of distributing a residual capacity of the sources to the parts.

Particularly, an aspect provides a method for configuring a network of interconnected sources and users, wherein an enlarging group (of interconnected sources and parts of the users) is selected in decreasing order of a residual capacity thereof, an adding part (adjacent to the enlarging group) is selected in decreasing order of a matching of a residual demand thereof with the residual capacity of the expanding group, and the adding part is merged into the enlarging group until all the parts belong to a single group.

A further aspect provides a computer program for implementing the method (and a corresponding computer program product).

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
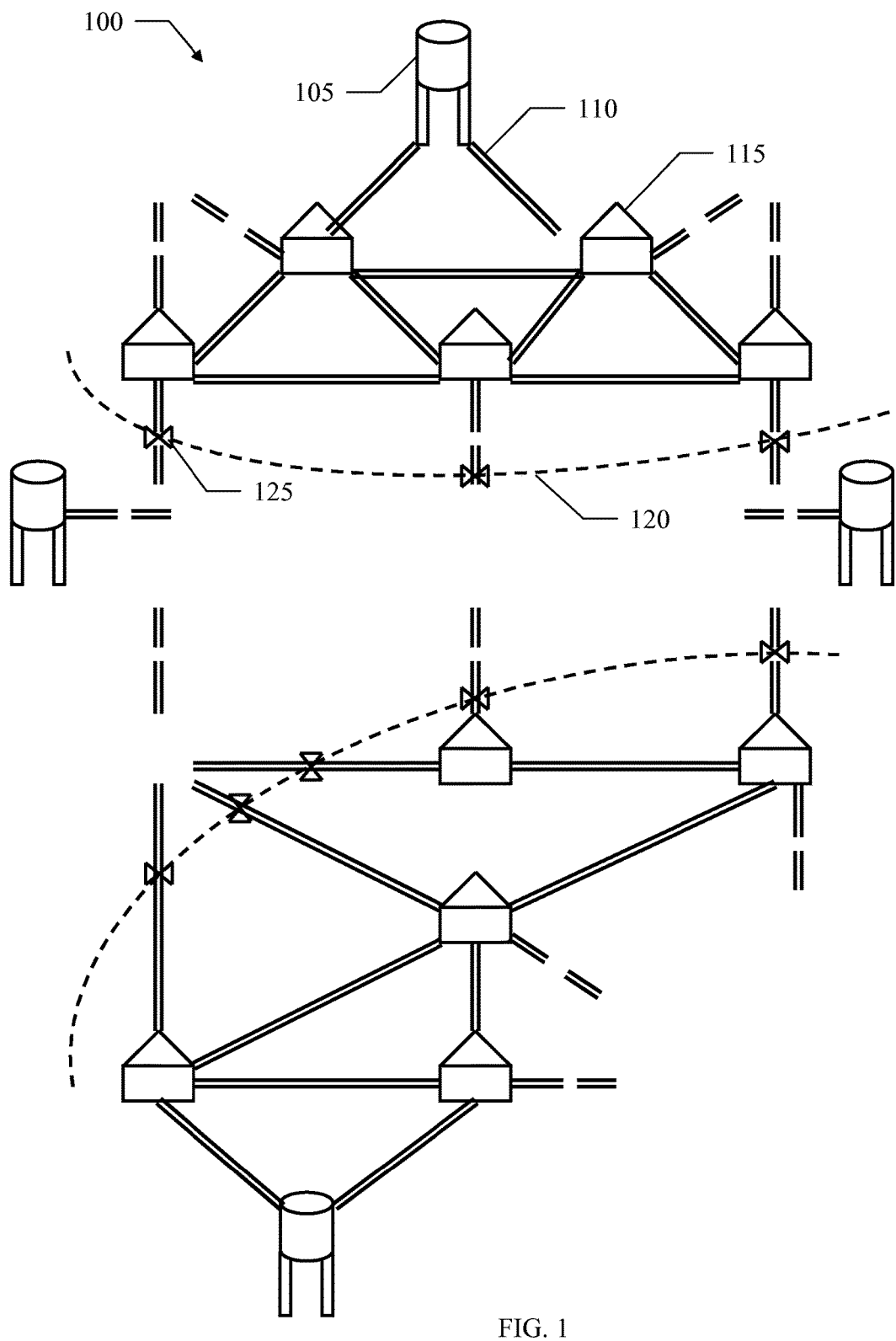
FIG. 1 shows a pictorial representation of a water distribution network to which the solution according to an embodiment of the present disclosure may be applied.

With reference in particular to the FIG. 1, a pictorial representation is shown of a water distribution network, or simply network, 100 to which the solution according to an embodiment of the present disclosure may be applied.

The network 100 is used to distribute water (for example, drinking water in urban areas). For this purpose, the network 100 comprises one or more sources 105 that collect and purify the water (for example, in reservoirs, tanks or towers). The sources 105 pressurize the water (for example, by pumps or gravity) and supply it to a pipe system 110. The pipe system 110 distributes the water to users 115 (for example, private houses). For this purpose, the pipe system 110 has a very complex structure, generally with a mesh topology wherein the sources 105 and the users 115 are highly interconnected among them. The network 100 is partitioned into two or more parts 120 (district metered areas), each one comprising one or more interconnected users 115; the parts 120 are separated hydraulically by intercepting and/or regulating valves (or turbines) 125 arranged along the pipe system 110 at their boundaries; particularly, the intercepting valves 125 are used to close corresponding connections in the pipe system 110 between different parts 120, whereas the regulating valves 125 are used to regulate a pressure of the water supplied from one part to another part.

Figure 2A:
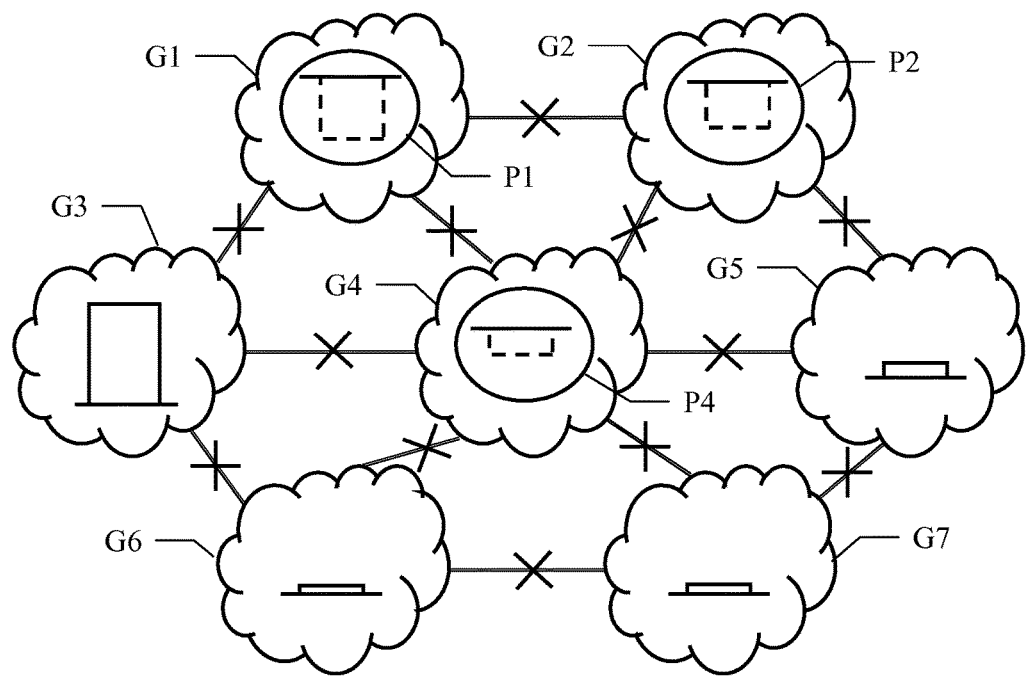
FIG. 2A-FIG. 2B show an exemplary application of the solution according to an embodiment of the present disclosure.
Figure 2B:
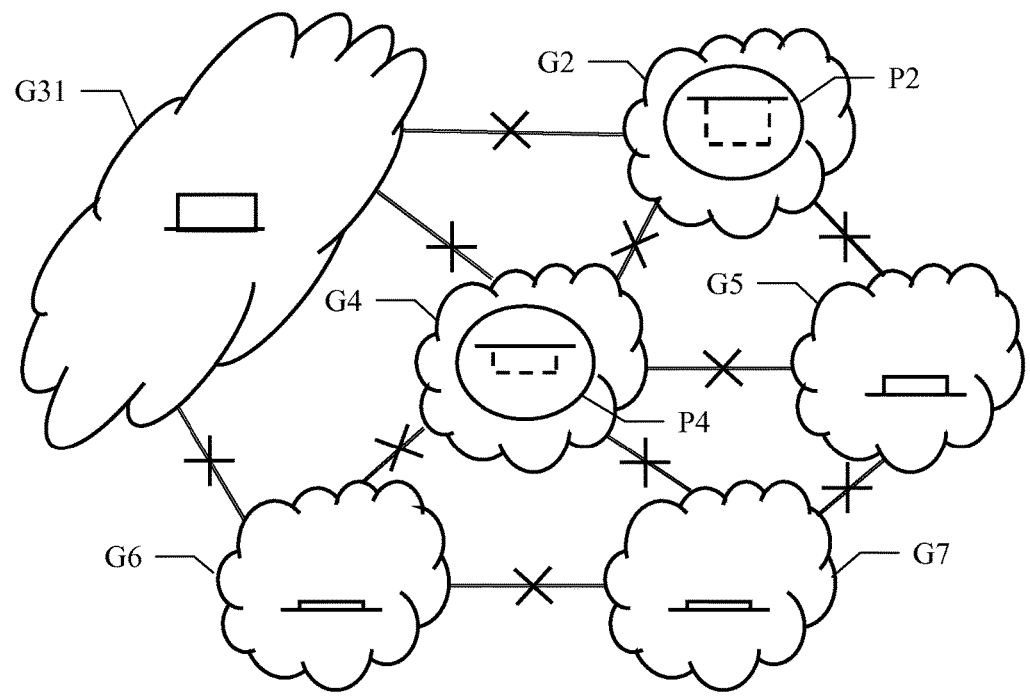

Moving to the FIG. 2A-FIG. 2B, an exemplary application is shown of the solution according to an embodiment of the present disclosure.

Starting from the FIG. 2A, in this case the sources and the parts of the network are grouped into a plurality of disjoint groups (for example, by initially grouping the parts sharing the same sources, with the parts that are not directly supplied by any source that are left outside this initial grouping); the groups are separated by setting the connections of the pipe system among them to a closed condition (as represented in the figure by crosses). Particularly, in the very simple case at issue seven groups G1-G7 are shown. Some groups (i.e., the groups G3, G5, G6 and G7 in this case) are over-supplied, since they have a residual capacity indicative of an excess of a supply balance based on the difference between a total capacity of the corresponding sources and a total demand of the corresponding users (as represented qualitatively in solid line above a reference); conversely, some parts (i.e., the parts P1, P2 and P4 of the groups G1, G2 and G4, respectively, in this case) are under-supplied, since they have a non-zero residual demand based on the difference between a total demand of the corresponding users and an estimated supply of the part (as represented qualitatively in dashed line below the reference).

One of the over-supplied groups is selected in decreasing order of their residual capacity (for example, the group G3 having the highest residual capacity). One of the under-supplied parts that are adjacent to this group G3 (i.e., the parts P1 and P4) is then selected in decreasing order of a matching of their residual demand with the residual capacity of the group G3 (for example, the part P1 having the residual demand that best matches the residual capacity of the group G3).

Moving to the FIG. 2B, the part P1 (and its group G1) is merged into the group G3 (by setting one or more connections between them to an open condition), so as to obtain a new group differentiated with the reference G31. The supply balance of the group G31 and the residual demand of its parts (and particularly the part P1) are then updated accordingly.

The same operations are repeated until all the parts belong to a single group (with further optimizations that may follow attempting to eliminate hydraulic problems that may possibly remain, such as an insufficient supply pressure in some parts or an excessively high speed in some pipes). At this point, the network may be configured according to the (open/closed) condition of its connections (for example, by placing an intercepting valve at each connection in the closed condition and a regulating valve at each connection in the open condition).

Therefore, in the solution according to an embodiment of the present disclosure the selection of the connections to be opened is driven by the residual capacity of the over-supplied groups; in other words, at each iteration the over-supplied group with the most suitable residual capacity (for example, the highest one) is selected, and then it is connected to one of its adjacent under-supplied parts that has the most suitable residual demand with respect to its residual capacity (for example, closest to each other).

In this way, the selection of the connections to be opened depends on the capacity of the corresponding sources and on the demand of the corresponding users; as a result, the connections that are opened are more appropriate (with a beneficial effect on the quality of the obtained results).

Figure 3:
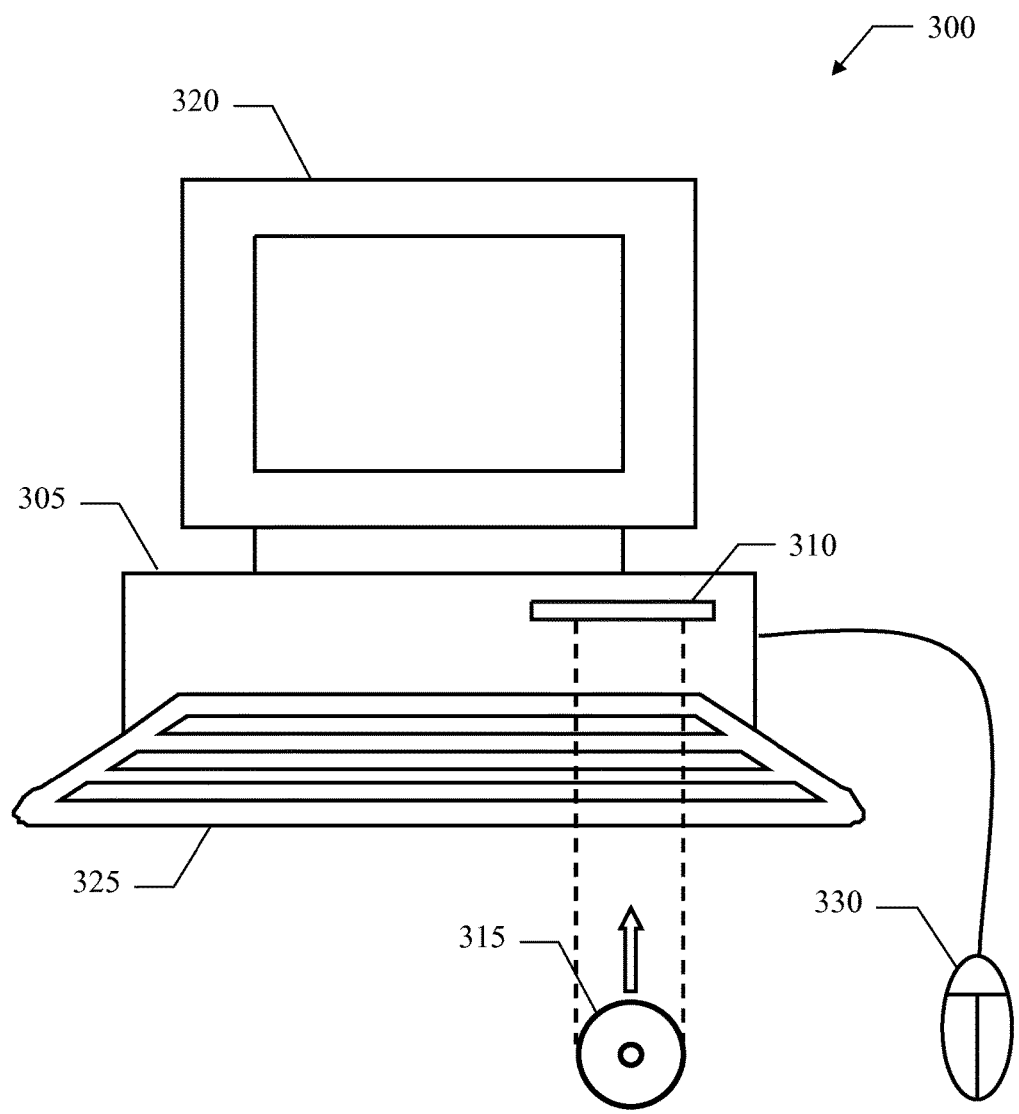
FIG. 3 shows a schematic block-diagram of a computing system that may be used to practice the solution according to an embodiment of the present disclosure.

Moving to the FIG. 3, a schematic block-diagram is shown of a computing system 300 that may be used to practice the solution according to an embodiment of the present disclosure.

The computing system, or simply computer, 300 (for example, a PC) comprises a central unit 305 that houses the electronic circuits controlling its operation; typically, these electronic circuits comprise a microprocessor, a working memory, drives for any input/output units, a wireless network adapter (for example, of the Wi-Fi type) for accessing a communication network, and the like. The computer 300 is also provided with a hard-disk and a drive 310 for reading optical disks 315 (for example, CDs or DVDs). A monitor 320 is used to display information on a screen thereof. Operation of the computer 300 is controlled with a keyboard 325 and a mouse 330, which are connected to the central unit 305 in a conventional manner.

Figure 4:
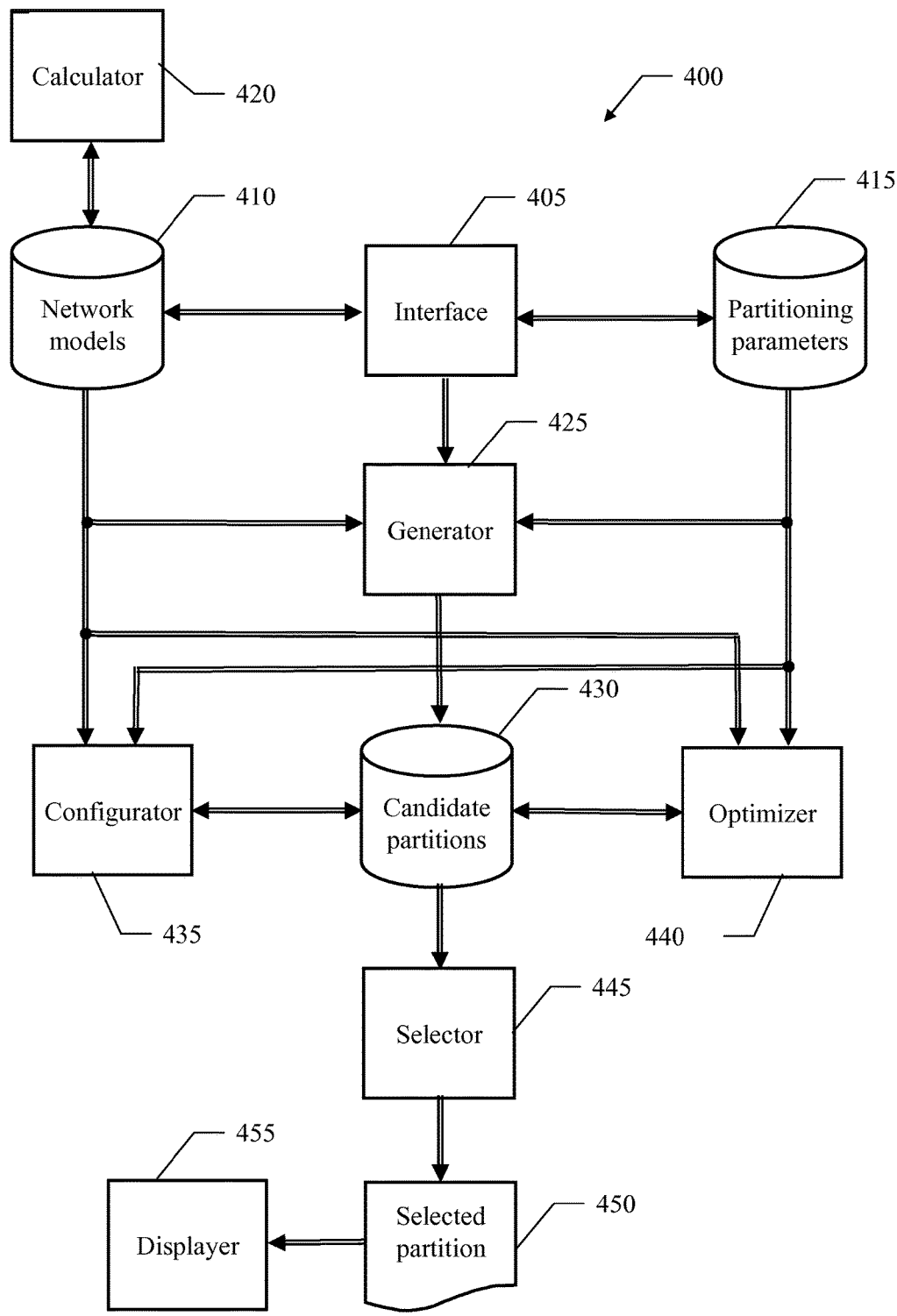
FIG. 4 shows the main software components that may be used to implement the solution according to an embodiment of the present disclosure.
Figure 5A:
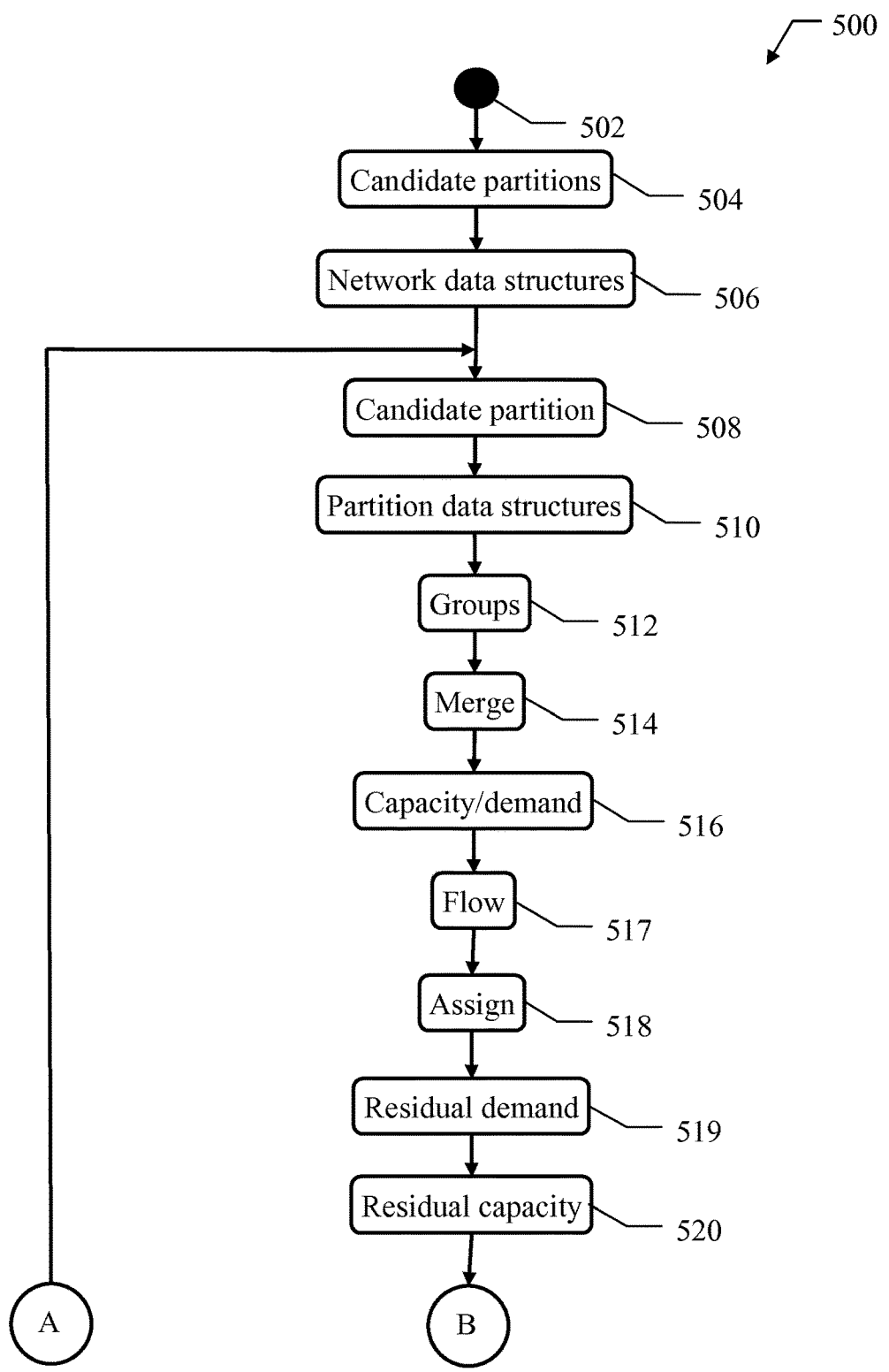
FIG. 5A-FIG. 5D show an activity diagram describing the flow of activities relating to an implementation of the solution according to an embodiment of the present disclosure.
Figure 5B:
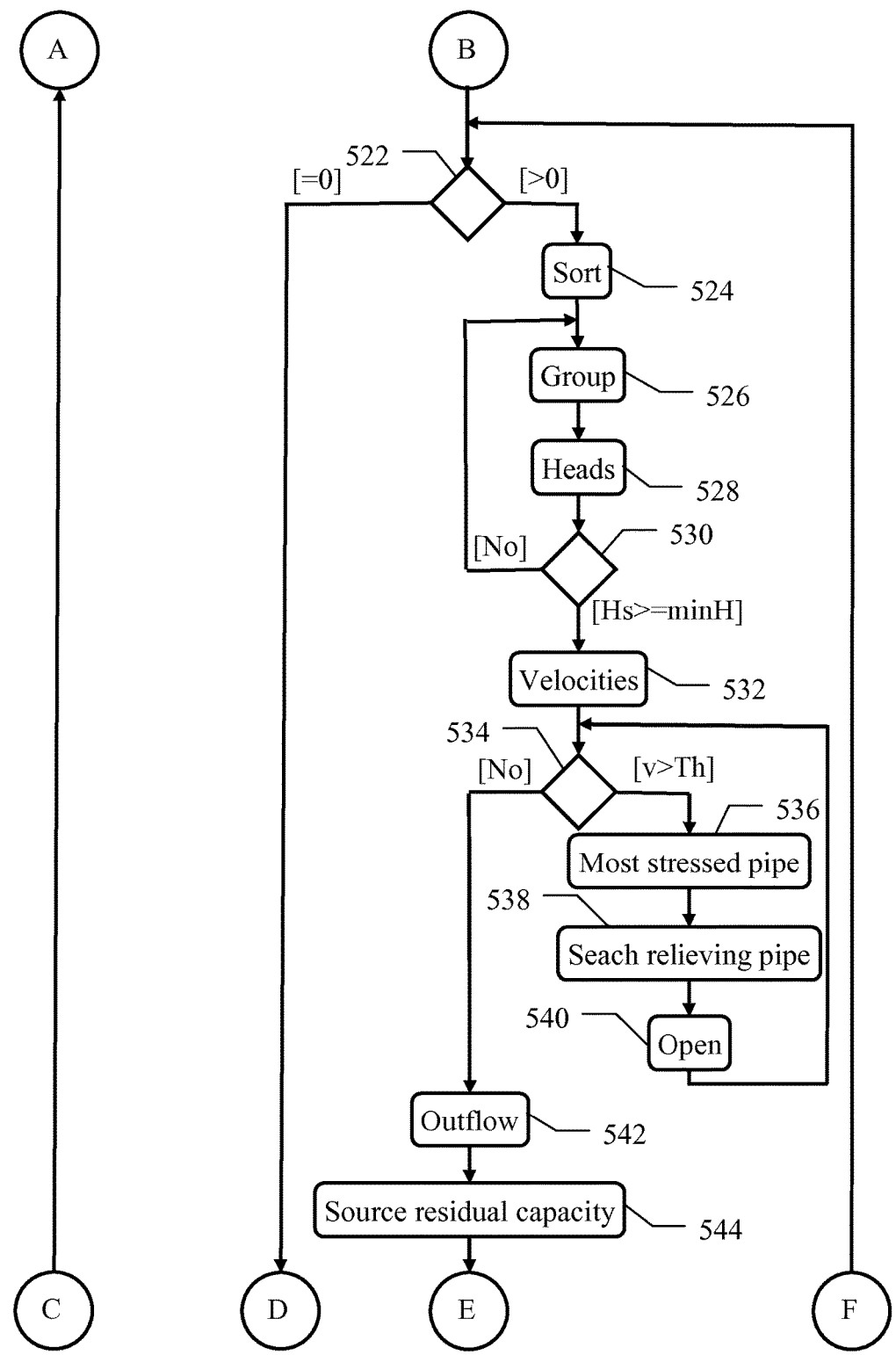
Figure 5C:
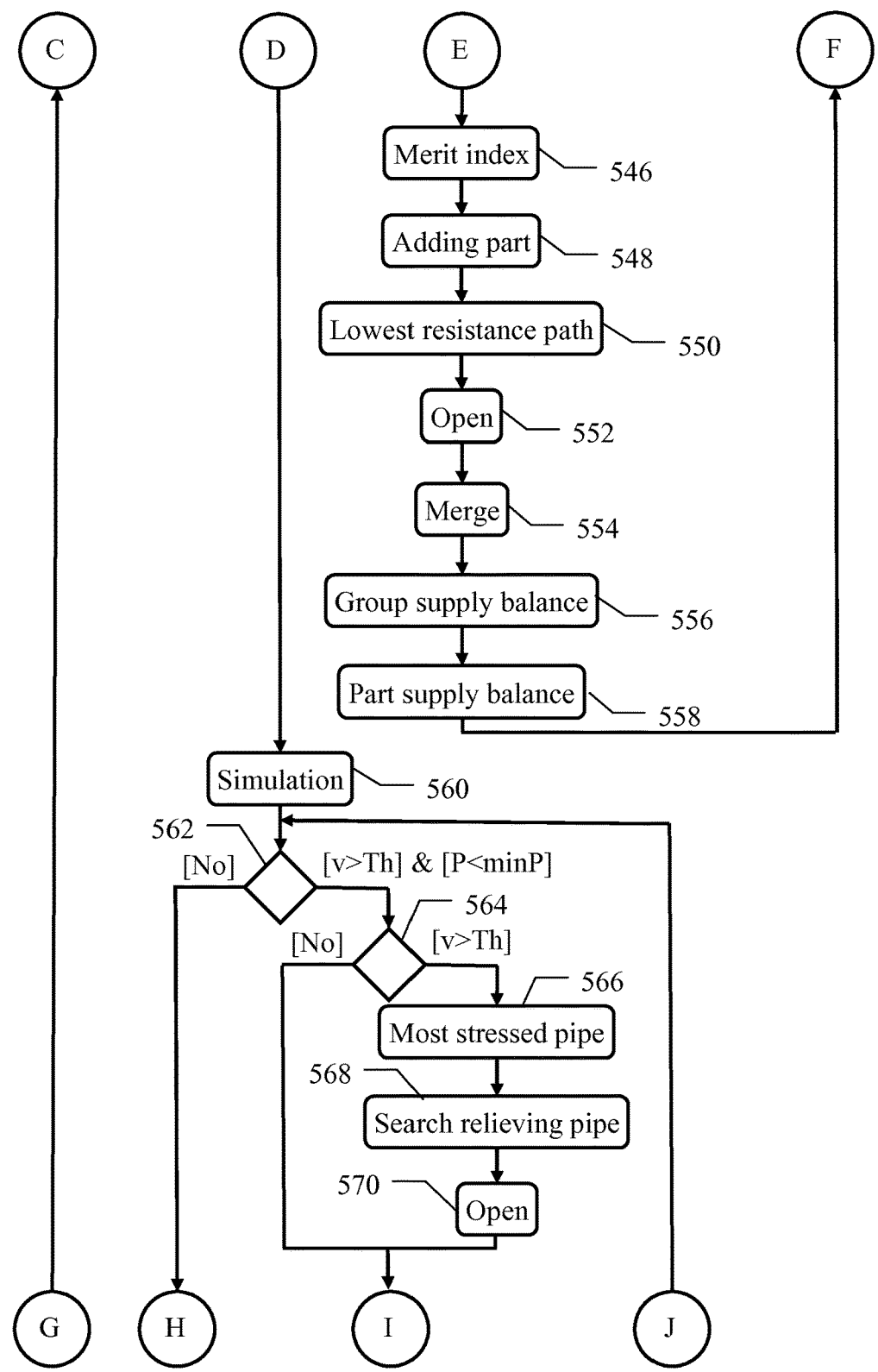
Figure 5D:
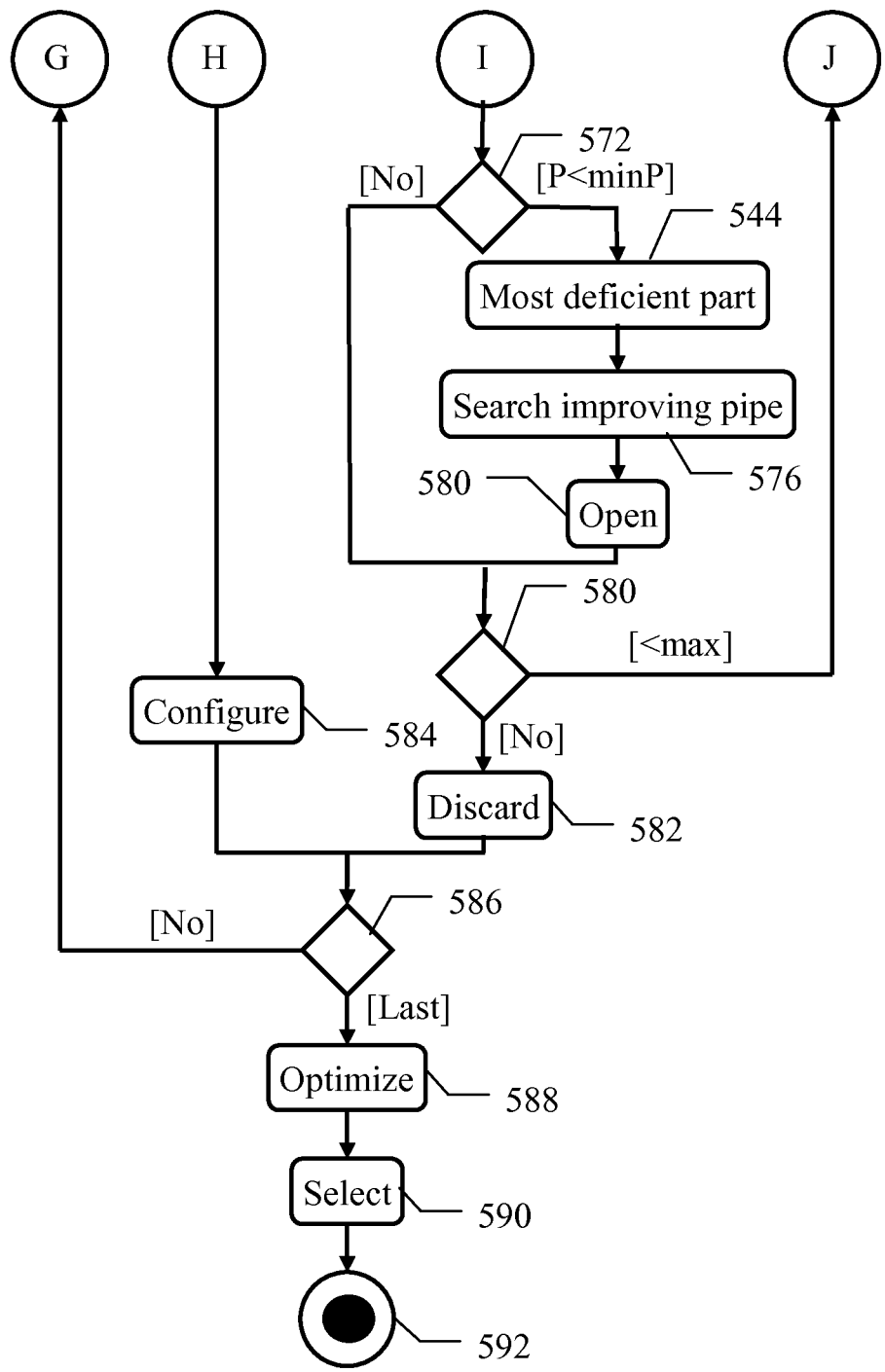

Moving to the FIG. 4, the main software components are shown that may be used to implement the solution according to an embodiment of the present disclosure.

Particularly, all the software components (programs and data) are typically stored in the mass memory and loaded (at least partially) into the working memory of the above-mentioned computer when the programs are running. The programs are initially installed into its mass memory, for example, from removable storage units or from the communication network. In this respect, each software component may represent a module, segment or portion of code, which comprises one or more executable instructions for implementing the specified logical function.

The computer runs a partitioner 400, which is used to partition generic networks (and especially water distribution networks). As described in detail in the following, the partitioner 400 implements a three-phase partitioning process for each (selected) network to be partitioned, wherein in a first (generation) phase multiple candidate partitions are generated, in a second (configuration) phase the candidate partitions are configured, and in a third (optimization) phase the candidate partitions are optimized (and one of them is then selected).

For this purpose, an interface 405 is used by an operator to enter information and/or commands. Particularly, the interface 405 manages a network repository 410 storing a network model of each network. The network model represents the corresponding network with a graph. Particularly, the graph represents each node (consisting of a single/concentrated source, user or junction of the pipe system) with a vertex and each pipe of the pipe system (directly connecting a pair of adjacent nodes) with an edge. The network model further comprises one or more attributes for each source, user and pipe. For example, each source is qualified by its (output) pressure, elevation (from ground) and (maximum water supply) capacity, each user is qualified by its elevation, (average or maximum water supply) demand and minimum service pressure (MSP), and each pipe is qualified by its (minimum) radius, length (for example, projected on a horizontal plane) and (average hydraulic) roughness. Moreover, the interface 405 manages a partitioning parameter repository 415 storing several parameters controlling the partitioning of the networks, either individually or globally (as described in the following). A calculator 420 accesses the network model repository 410 for calculating further attributes of the sources, users and pipes of each network model (as described in the following), which further attributes are added to the network model.

The interface 405 controls a generator 425, which implements the generation phase of the partitioning process for each network (for generating all the candidate partitions thereof); for this purpose, the generator 425 accesses the network model repository 410 and the partitioning parameter repository 415. The generator 425 saves a definition of each candidate partition of the network (as defined by the nodes of each part thereof) into a candidate partition repository 430.

A configurator 435 accesses the network model repository 410, the partitioning parameter repository 415 and the candidate partition repository 430. The configurator 435 implements the configuration phase of the partitioning process for each network (for configuring its candidate partitions in terms of intercepting valves and regulating valves). The configurator 435 adds the configuration of each candidate partition (as defined by the position of its intercepting valves and regulating valves) to the corresponding definition in the candidate partition repository 430.

An optimizer 440 accesses the network model repository 410, the partitioning parameter repository 415 and the candidate partition repository 430. The optimizer 440 implements the optimization phase of the partitioning process for each network (for optimizing its candidate partitions in terms of setting of its regulating valves). The optimizer 440 adds the optimization of each candidate partition (as defined by the setting of its regulating valves) to the corresponding definition in the candidate partition repository 430.

A selector 445 accesses the candidate partition repository 430. The selector 445 selects one of the candidate partitions of each network, and it saves the definition of the selected (candidate) partition into a selected partition repository 450.

A displayer 455 accesses the selected partition repository 450 for outputting a corresponding (graphical and/or tabular) representation of the selected partition of each network (for example, by displaying it on the monitor of the computer).

Moving to the FIG. 5A-FIG. 5D, an activity diagram is shown describing the flow of activities relating to an implementation of the solution according to an embodiment of the present disclosure.

Particularly, the diagram represents an exemplary partitioning process of a generic network with a method 500. In this respect, each block may represent one or more executable instructions for implementing the specified logical function on the above-mentioned computer.

The partitioning process begins at the black start 502 and then passes to block 504 that implements the generation phase of the partitioning process, wherein multiple candidate partitions of the network are generated in a desired number. For example, for this purpose it is possible to use a generation algorithm derived from the general concepts of the k-means algorithm (but differing radically from it because the nodes, i.e., users, of each part are clustered around multiple poles instead of a single centroid). Briefly, a set of (initial) nodes equal to a desired number of parts of each candidate partition is selected randomly; for each initial node all the poles of a corresponding part are initialized to the this initial node. An assign operation is then performed, wherein each node is assigned to the part of the closest pole. For this purpose, a distance of each node from each pole is calculated as the shortest path between them that minimizes the sum of the distances between the corresponding pairs of adjacent nodes; in turn, the distance between each pair of adjacent nodes is calculated as the weighted sum of a length term (proportional to a dimensionless value depending on the length of the corresponding pipe) and an elevation term (proportional to a dimensionless value depending on the absolute value of the difference between the elevations of the corresponding nodes). Moreover, the distance of each node from each pole is adjusted by adding an adjustment term (proportional to a dimensionless value depending on the absolute value of the difference between the elevations of the node and of the pole); the distance of each node from each pole is further scaled according to a scaling factor of the part of the pole (initialized at the beginning of each iteration of the generation algorithm to a neutral value that leaves the distance unchanged). At this point, a global (load) off-balance of the current partition is calculated (as a dimensionless value depending on the loads of the parts, in turn based on the demands of its nodes). If the global off-balance is higher than an off-balance threshold, the nodes are moved to the least loaded part, but maintaining this part the least loaded one. For this purpose, a (new) scaling factor is calculated of each part according to a local (load) off-balance of the part (defined as above only on the basis of the loads of its nodes) so as to reduce and increase the distances of each node from the poles of the part when the part is under-loaded or over-loaded, respectively, and according to a scaling weight that is updated incrementally so as to increase the scaling. The assignment of each node to the part of the closest pole is then repeated with this scaling factor, until the least loaded part of the current partition is not the same (or the global off-balance becomes lower than the off-balance threshold or the scaling may not be further incremented). At this point, a global objective function to be optimized is calculated as the sum or the maximum of the distances (as adjusted but not scaled) of each node of the network from the closest pole of its part. If no convergence condition is satisfied (for example, determining when the objective function is not progressing towards a local minimum, is diverging from the local minimum, is steady at the local minimum or is oscillating around the local minimum), a move operation is performed wherein the poles of each part are moved to new positions which depend on the nodes assigned to the part. For this purpose, in each part a local objective function is calculated for each possible combination of the poles of the part (possibly reduced according to a sampling factor) in the same way as above but only for the nodes of the part. The assign operation and possibly the move operation are then repeated on the (new) partition so obtained. As soon as at least one of the convergence conditions is satisfied, the partition is verified against one or more approval conditions (for example, to determine whether none of the parts has disconnected nodes or the global off-balance of the partition is within the off-balance threshold). If all the approval conditions are satisfied, this partition is accepted as a candidate partition for the network.

The partitioning process then implements the configuration phase of the partitioning process (for configuring the candidate partitions of the network in term of their intercepting and regulating valves). For this purpose, (network) data structures to be used for the configuration of all the candidate partitions are initialized at block 506. Particularly, the (hydraulic) head of each source is calculated according to its pressure and elevation:

$$Hs = \frac{Ps}{\gamma} + Es$$

where Hs is the head, Ps is the pressure, $\gamma$ is the unit weight of the water and Es is the elevation. Moreover, the capacity of each source is estimated (when it is not actually known) according to a hydraulic simulation; for example, an outflow over time of each source is determined by running a full-day simulation of the network model with a hydraulic solver, a peak time at which a total outflow of all the sources is maximum is identified, and then the capacity of each source is set to its outflow at the peak time. Moreover, a (hydraulic) resistance of each pipe is calculated according to its diameter, length and roughness:

$$w = \frac{R \cdot L}{3r}$$

where w is the resistance, R is the roughness, L is the length and r is the radius, and it is added as a weight to the corresponding edge of the network model; the resistance between each pair of non-adjacent nodes (i.e., non-directly connected by a pipe) is then calculated as the shortest path between them that minimizes the sum of the resistances between the corresponding pairs of adjacent nodes (for example, by the Floyd-Warshall algorithm).

A loop is now performed for each candidate partition (starting from a first one in any arbitrary order). The loop begins at block 508 wherein the definition of a (current) candidate partition is retrieved. Continuing to block 510, (partition) data structures to be used for the configuration of the candidate partition are initialized. Particularly, for each part a minimum supply elevation is calculated that is required to supply all its users:

$$minE = max(E_i)$$

where minE is the minimum supply elevation, $E_i$ is the elevation of the i-th user of the part and max( ) is the maximum operator; likewise, for each part a minimum supply head is calculated that is required to supply all its users:

$$minH = max\left(\frac{minP_i}{\gamma} \mid E_i\right)$$

where minH is the minimum supply head and $minP_i$ is the minimum service pressure of the i-th user of the part. Moreover, the pipes connecting each pair of adjacent parts (referred to as inter-part pipes) are identified; all these inter-part pipes are initialized to the closed condition (i.e., closing the connection between the corresponding parts).

A set of (initial) groups is created at block 512. Particularly, for each source a group is created comprising the source and every part that is directly supplied by it (i.e., comprising a node that is connected to the source by a pipe); the parts that not directly connected to any source are instead left outside any group. Continuing to block 514, the groups that share a same source or a same part are merged (for example, when two sources both of them directly supply the same part); this ensures that all the groups are disjoint (without any source and part in common). With reference now to block 516, for each part a total demand is calculated as the sum of the demands of all its users (possibly increased according to an estimated, maximum or average, loss of the network, for example, by 10-25%); a total demand of each group is then calculated as the sum of the total demands of its parts. Likewise, for each group a total capacity is calculated as the sum of the capacities of all its sources.

The total capacity of each group is then used to supply its parts so as to satisfy (totally or partially) their demand. For this purpose, at block 517 for each group the flow at the peak time across each inter-part pipe of the group is estimated by running a simulation of the corresponding portion of the network model (cropped by only retaining its users, sources and pipes). The (estimated) supply of each part of the group is then set at block 518 to a total inflow of the corresponding inter-part pipes (i.e., the sum of the flow entering the part minus the flow leaving the part). The use of hydraulic simulations (here and below) at intermediate stages of the partitioning process (without waiting for its completion) makes it more robust. A residual demand of each part is then calculated at block 519 as the difference between its total demand and estimated supply; when the residual demand is strictly higher than zero, the part is under-supplied (with its residual demand that is still to be satisfied). Likewise, a supply balance of each group is calculated at block 520 as the difference between its total capacity and its total demand; when the supply balance is strictly positive, the group is over-supplied and its supply balance defines a residual capacity of its sources that may be used to supply other parts.

A test is made at block 522 to verify the occurrence of two conditions, namely, (i) that all the parts have become part of some group and (ii) that only one group remains (i.e., all the parts belong to a single group). If any of those two conditions is not satisfied, the flow of activity descends into block 524; at this point, the groups are sorted in descending order of their residual capacity. Continuing to block 526, the groups are scanned in succession (starting from the one with the highest residual capacity). The highest head of the sources of the (current) group is compared at block 528 with the minimum supply head of its adjacent parts. The result of this comparison is verified at block 530; if the highest head of the group is strictly lower than the lowest minimum supply head of the adjacent parts (meaning that the group may not supply any of the adjacent parts, and then it may not be expanded), the flow of activity returns to the block 526 to take into account a next group.

Conversely, if the highest head of the group is higher than or equal to the lowest minimum supply head of the adjacent parts, meaning that the group (referred to as expanding group) is suitable to be expanded, the flow of activity descends into block 532 (for the sake of simplicity, the exceptional case wherein no group may be expanded is not taken into account). At this point, a hydraulic simulation is used to distribute the residual capacity of the expanding group to its sources. The results of this simulation also provide an early indication of hydraulic problems that may occur in the expanding group, so they may be possibly fixed at the earliest time. Particularly, for this purpose the velocity of the water in each inter-part pipe of the expanding group is calculated (from the result of the corresponding hydraulic simulation that has been run previously):

$$v = \frac{Q}{\pi r^2}$$

where v is the velocity, Q is flow and $\pi r^2$ is the section. The velocities of the inter-part pipes are compared at block 534 with a threshold velocity defining a maximum value thereof that is acceptable (for example, 1-3 m/s).

If the velocity of one or more (stressed) inter-part pipes is (possibly strictly) higher than the velocity threshold, the (most stressed) inter-part pipe with the highest velocity is identified at block 536. For each other inter-part pipe (between the same parts of the most stressed inter-part pipe) that is in the closed condition, a further simulation is run of the same portion of the network model corresponding to the expanding group but with this inter-part pipe in the open condition; the (new) velocity of the most stressed inter-part pipe is then calculated as above at block 538. Continuing to block 540, the (relieving) inter-part pipe providing the highest reduction of the velocity of the most stressed inter-part pipe is set to the open condition. The flow of activity then returns to the block 534 to repeat the same operations (by exploiting the simulation already run on the last version of the same portion of the network model).

Referring back to the block 534, as soon as all the velocities are (possibly strictly) lower than the velocity threshold (and in any case before a pre-defined number of attempts to relieve the most stressed inter-part pipes, for example, 10-20, is exceeded), the flow of activity descends into block 542; in this phase, the outflow of each source of the expanding group is calculated as the sum of the flows of the corresponding pipes. The residual capacity of each source of the expanding group is then calculated at block 544 as its capacity minus its outflow.

Continuing to block 546, a merit index (MI) is calculated for each (candidate) pair formed by a source of the expanding group and each adjacent part thereof; the merit index is equal to the harmonic mean of a capacity merit factor (MFc) and a head merit factor (MFh):

$$MI = \frac{2 \cdot MFc \cdot MFh}{MFc + MFh}$$

In turn, the capacity merit factor is equal to:

$$MFc = \frac{\lfloor \min(RC, RD) \rfloor^2}{RC \cdot RD}$$

wherein RC is the residual capacity of the source, RD is the residual demand of the adjacent part, and min( ) is the minimum operator; the capacity merit factor increases with a matching between the residual capacity of the source and the residual demand of the adjacent part (i.e., when a large fraction of the residual capacity of the source may be transferred to the adjacent part and a large fraction of the residual demand of the adjacent part may be satisfied by the source), with its maximum value (1) that is attained when the residual capacity of the source is equal to the residual demand of the adjacent part. Moreover, the head merit factor is equal to:

$$MFh = 1 - \frac{\min(0, Hs - \min H)}{\max(0, Hs - \min E)}$$

The head merit factor increases with a matching between the head of the source and the minimum supply head of the adjacent part (i.e., when the head of the source is just enough to supply the adjacent part), with its maximum value (1) that is attained when the head of the source is equal to the minimum supply head of the adjacent part. A (matching) pair having the highest merit index is then identified. Continuing to block 548, the adjacent part (referred to as adding part) of the matching pair is selected for adding to the expanding group.

With reference now to block 550, the resistance is retrieved of the path from the source of the matching pair (referred to as transferring source) to each boundary node of the adding part; the path with the lowest resistance is then identified. Continuing to block 552, the inter-part pipe between the expanding group and the adding part in the lowest resistance path is set to the open condition. The adding part and its possible group is merged at block 554 into the expanding group; in this way, the adding part is added to the expanding group at the same time ensuring that all the groups are still disjoint. Accordingly, the supply balance of the (merged) expanding group is updated at block 556 by adding the (negative) supply balance of the group of the adding part. Continuing to block 558, the supply of the parts of the expanding group is estimated as above by running a hydraulic simulation of the corresponding portion of the network model (i.e., by calculating the flow at the peak time across each inter-part pipe of the expanding group, and calculating the estimated supply of each part of the expanding group as the sum of the inflow of the corresponding inter-part pipes); the (new) residual demand of each part of the expanding group is then calculated again as the difference between its total demand and estimated supply. The flow of activity then returns to the block 522 to repeat the same operations described above.

Referring back to the block 522, the above-described loop is exit by descending into block 560 as soon as all the parts belong to one and the same (single) group; for the sake of simplicity, it is assumed that in this case a single group remains (similar considerations apply to the exceptional cases wherein distinct groups may be supplied independently). At this point, the group so obtained is verified to ensure that it is acceptable from a hydraulic point of view. For this purpose, the flow across each inter-part pipe and the supply pressure of each user at the peak time are determined by running a simulation of the network model (with the inter-part pipes in the open/closed conditions determined above), and the velocity of the water in each inter-part pipe is then calculated from its pressure as above. With reference now to block 562, the velocities of the inter-part pipes are compared with the same threshold velocity and the lowest supply pressure of the users of each part is compared with the corresponding minimum service pressure.

If the velocity of one or more (stressed) inter-part pipes is (possibly strictly) higher than the velocity threshold and/or the lowest supply pressure of one or more (deficient) parts is (possibly strictly) lower than the corresponding minimum service pressure, a further test is made at block 564 to verify the number of stressed inter-part pipes. If one or more inter-part pipes are stressed, the (most stressed) inter-part pipe with the highest velocity is identified at block 566. For each other inter-part pipe (between the same parts of the most stressed inter-part pipe) that is in the closed condition, a simulation is run of the network model but with this inter-part pipe in the open condition; the (new) velocity of the most stressed inter-part pipe is then calculated as above at block 568. Continuing to block 570, the (relieving) inter-part pipe providing the highest reduction of the velocity of the most stressed inter-part pipe is set to the open condition. The flow of activity then descends into block 572; the same point is also reached directly from the block 564 when no inter-part pipe is stressed. At this point, a test is made to verify the number of deficient parts. If one or more parts are deficient, the (most deficient) part with the highest difference between the lowest supply pressure and the minimum service pressure is identified at block 574. For each inter-part pipe (between the part of the most deficient part and any adjacent part thereof) that is in the closed condition, a simulation is run of the network model but with this inter-part pipe in the open condition; the (new) lowest supply pressure of the most deficient part is then calculated as above at block 576. Continuing to block 578, the (improving) inter-part pipe providing the highest increment of the lowest supply pressure of the most deficient part is set to the open condition.

The flow of activity then descends into block 580; the same point is also reached directly from the block 572 when no part is deficient. At this point, a test is made to verify the number of attempts that have been made to relieve the stressed inter-part pipes and/or to improve the deficient parts. If the number of attempts has reached a maximum allowable value (for example, 5-10) the candidate partition is discarded at block 582 (since it does not allow satisfy the demands of the users with the required performance). Conversely, the flow of activity returns to the block 562 to repeat the same operations (by exploiting the simulation already run on the last version of the network model). Referring back to the block 562, if the velocity of all the inter-part pipes is (possibly strictly) lower than the velocity threshold and the lowest supply pressure of all the parts is (possibly strictly) higher than the corresponding minimum service pressure, the obtained configuration of the candidate partition is accepted at block 584; particularly, an intercepting valve is arranged at each inter-part pipe in the closed condition and a regulating valve (or a turbine) is arranged at each inter-part pipe in the open condition. The flow of activity then merges at block 586 from either the block 582 or the block 584; at this point, a test is made to verify whether all the candidate partitions have been processed. If not the flow of activity returns to the block 508 to repeat the same operations for a next candidate partition.

Conversely, as soon as all the candidate partitions have been processed, the flow of activity descends into block 588 that implements the optimization phase of the partitioning process (for optimizing the candidate partitions in terms of setting of their regulating valves); for example, in each candidate partition the regulating valves (or turbines) are set so as to optimize the pressure supplying each part (and possibly to maximize the generated energy). One of the candidate partitions is then selected at block 590 according to one or more selection criteria; for example, the selection criteria may be based on a cost in terms of the required intercepting valves, on an estimated reduction of the leakages, on a possible return in terms of energy that may be generated by the turbines and/or on a reduction of hydraulic reliability (for example, as described in the above-mentioned document by De Paola et al.). The partitioning process then ends at the concentric white/black stop circles 592.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation)

should be intended as any entity or structure suitable for carrying out the relevant function.

For example, an embodiment provides a method for configuring a network of interconnected sources and users of a commodity. The method comprises the following steps. A partition is provided of the users into a plurality of disjoints parts (each one comprising one or more interconnected users); each inter-part connection between different parts is set to a closed condition. A grouping at least partial of the sources and parts into a plurality of disjoint groups (each one comprising one or more interconnected sources and parts) is initialized. The method then involves repeating the following steps. An enlarging group is selected among the groups being over-supplied (by having a residual capacity indicative of an excess of a supply balance thereof, based on the difference between a total capacity of the corresponding sources and a total demand of the corresponding users); the enlarging group is selected in decreasing order of the residual capacity of the over-supplied groups. An adding part is selected among the parts adjacent to the enlarging group being under-supplied (by having a non-zero residual demand based on the difference between a total demand of the corresponding users and an estimated supply of the part by the sources); the adding part is selected in decreasing order of a matching of the residual demand of the under-supplied parts with the residual capacity of the expanding group. The adding part and the possible group thereof is merged into the enlarging group, by setting at least one inter-part connection between the adding part and the expanding group to an open condition. The supply balance of the merged enlarging group and the residual demand of the parts thereof are updated according to the merging. The above-mentioned steps are repeated until all the parts belong to a single group. An arrangement of one or more intercepting/regulating elements is determined according to the conditions of the connections.

However, the network may be of any type, with any number and type of sources, users and connections (see below), and it may be configured with any number and type of intercepting/regulating elements (for example, valves, turbines, taps, gates). The method may be applied to any number (one or more) of partitions of the network (each one with any number of parts), which partitions may be generated in any way (for example, with a standard k-mean algorithm); more generally, the same method may be applied to the three-step partitioning process described above, to a two-step partitioning process (without any optimization), or even to a single partition. The specific steps of the above-mentioned method may be implemented in different ways (see below).

In an embodiment, said initializing a grouping of the sources and parts comprises creating a group for each source (with the group that comprises the source and each part directly connected thereto); the groups sharing a same source and/or a same part are merged.

However, the groups may be initialized in another way; for example, the same result may also be achieved by further creating a distinct group for each part that is not directly supplied by any source.

In an embodiment, said initializing a grouping of the sources and parts comprises the following steps for each group. A flow is estimated across each inter-part connection of the group; the estimated supply of each part of the group is set according to the sum of the flow of the corresponding inter-part connections entering the part.

However, this result may be achieved by running a simulation in any way of the corresponding portion of any model of the network. Alternatively, the supply of the parts of the group may be estimated with a heuristic technique. For example, the total capacity of the group is used to satisfy in succession first its internal parts (i.e., whose adjacent parts all belong to the same group) and then its boundary parts (i.e., having one or more adjacent parts that do not belong to the same group). More specifically, the total capacity of the group is used to satisfy the internal parts in proportion to their total demand (at most up to it). Once the total demand of the internal parts has been satisfied completely, any remains of the total capacity of the group is used to satisfy the boundary parts again in proportion to their total demand. This favors the internal parts that are more difficult to be supplied from outside the group.

In an embodiment, said selecting an enlarging group comprises skipping each group that has a highest supply energy (among a supply energy of its sources) lower than a corresponding minimum supply energy required by all the under-supplied parts adjacent to the group.

However, the supply energy may be defined by the head, the elevation or a combination thereof; in any case, the possibility of always selecting the most over-supplied group is not excluded.

In an embodiment, said selecting an adding part comprises the following operations. The total demand of the expanding group is distributed throughout the sources thereof. A residual capacity of each source of the enlarging group is calculated according to the difference between the capacity of the source and the total demand distributed thereto. A matching pair is selected among one or more candidate pairs formed by each source of the expanding group and each under-supplied part adjacent to the expanding group; the matching pair is selected according to a comparison between the residual capacity of the source and the residual demand of the under-supplied part of the candidate pairs.

However, the total demand of the expanding group may be distributed throughout its sources in any way (see below); moreover, the matching pair may be selected according to any capacity factor (for example, based on a normalized difference or ratio). More generally, the adding part may be selected in different ways (for example, simply comparing the residual demand of the adjacent parts with the residual capacity of the enlarging group).

In an embodiment, said distributing the demands of the users comprises estimating an outflow of each source of the expanding group, and distributing the total demand of the expanding group to each source thereof according to the corresponding outflow.

However, the total demand of the expanding group may be distributed throughout its sources again by running a simulation in any way of the corresponding portion of any model of the network (for example, by running the simulation of all the groups before selecting the expanding group) or by heuristic techniques.

In an embodiment, said distributing the total demand of the expanding group comprises the following steps. A stress is estimated of each inter-part connection of the expanding group. For each most stressed connection of the inter-part connections of the enlarging group (whose stress is higher than a stress threshold) at least one relieving connection is selected among the inter-part connections between the parts of the most stressed connection for reducing the stress thereof. Each relieving connection is set to the open condition.

However, the same procedure may be applied by discarding the partition when the most stressed connections may not be relieved, or even without any attempt to relieve them; more generally, the demands of the users may be distributed to the sources in different ways (for example, simply uniformly).

In an embodiment, said selecting an adding part comprises selecting the adding part further in decreasing order of a matching of the corresponding minimum supply energy required by the under-supplied parts with the supply energy of the sources of the expanding group.

However, the supply energy may be used to select the adding part in any way (see below); in any case, different, additional or alternative attributes (for example, the distance) may be taken into account for selecting the adding part (down to the sole supply balance).

In an embodiment, said selecting an adding part comprises selecting the matching pair further according to a comparison between the supply energy of the source and the minimum supply energy required by the under-supplied part of the candidate pairs.

However, the matching pair may be selected according to any energy factor (for example, based on a normalized difference or ratio of the heads only, the elevations only or both of them), which may combined with the capacity factor in any way (for example, their arithmetic or geometric mean).

In an embodiment, said merging the group of the adding part into the enlarging group comprises the following steps. A lowest resistance path is determined from the source of the matching pair to the adding part; the inter-part connection between the expanding group and the adding part in the lowest resistance path is set to the open condition.

However, the resistance of each connection may be defined in any way (for example, simply by their length). In any case, the inter-part connections to be opened may be in any number (from one to all) and selected in different ways (for example, randomly).

In an embodiment, said updating the supply balance of the merged enlarging group and the residual demand of the parts thereof comprises estimating a flow across each inter-part connection of the merged expanding group, and setting the estimated supply of each part thereof according to the difference between the sum of the flow of the corresponding inter-part connections entering the part and the total demand of the part.

However, the supply balance and the residual demands may be updated again by running a simulation in any way of the corresponding portion of any model of the network or by heuristic techniques (for example, according to a transferred flow that is calculated as the lower value between the residual capacity of the transferring source and the residual demand of the adding part).

In an embodiment, the method further comprises the following steps. A further stress is estimated of each inter-part connection of the network. For each further most stressed connection of the inter-part connections of the network whose further stress is higher than a further stress threshold, at least one further relieving connection is selected among the inter-part connections between the parts of the further most stressed connection for reducing the further stress thereof. Each further relieving connection is set to the open condition. In addition or in alternative, a lowest supply pressure is estimated of the users of each part of the network. For each most deficient part of the parts of the network whose lowest supply pressure is lower that a corresponding minimum supply pressure required by the part, at least one improving connection is selected among the connections between the most deficient part and each part adjacent to the most deficient part for increasing the lowest supply pressure thereof. Each improving connection is set to the open condition.

However, the partition may always be accepted after a predetermined number of attempts to relieve the further most stressed connections and/or to improve the most deficient parts, or even without any attempt to relieve/improve them. More generally, the configuration of the network may involve additional, different or alternative operations (for example, to reduce the leakages).

In an embodiment, the network is a water distribution network.

However, the network may be used to distribute any type of water (for example, fresh water) to any kind of nodes (for example, industrial or commercial establishments, fire hydrants). In any case, the same method may also be applied to different networks (for example, gas distribution networks).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program, which is configured for causing a computing system to perform the steps of the above-described method. A further embodiment provides a computer program product comprising a non-transitory computer readable medium embodying a computer program, which computer program is loadable into a working memory of a computing system thereby configuring the computing system to perform the same method.

However, the computer program may be implemented as a stand-alone module, as a plug-in for a pre-existing software program (for example, a partitioner that is already available), or even directly in the latter. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the same method.

However, the method may also be carried out on a system based on a different architecture (for example, a local, wide area, global, cellular or satellite network), and exploiting any type of (wired and/or wireless) connections. It would be readily apparent that it is also possible to deploy the same solution as a service that is accessed through a network (such as in the Internet). Each computing machine may have another structure or may comprise similar elements; moreover, it is possible to replace the computing machine with any code execution entity, either based on a physical machine or a virtual machine (such as a tablet, a mobile phone, and the like), or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for configuring a network of interconnected sources and users of a commodity, the method comprising:
   providing a partition of the users into a plurality of disjoints parts each one comprising one or more interconnected users, each inter-part connection between different parts being set to a closed condition;
   initializing a grouping at least partial of the sources and parts into a plurality of disjoint groups each one comprising one or more interconnected sources and parts;
   repeating:
      selecting an enlarging group among the groups being over-supplied by having a residual capacity indicative of an excess of a supply balance thereof based on the difference between a total capacity of the corresponding sources and a total demand of the corresponding users, the enlarging group being selected in decreasing order of the residual capacity of the over-supplied groups,
      selecting an adding part among the parts adjacent to the enlarging group being under-supplied by having a non-zero residual demand based on the difference between a total demand of the corresponding users and an estimated supply of the part by the sources, the adding part being selected in decreasing order of a matching of the residual demand of the under-supplied parts with the residual capacity of the enlarging group,
      merging the adding part into the enlarging group by setting at least one inter-part connection between the adding part and the enlarging group to an open condition,
      updating the supply balance of the merged enlarging group and the residual demand of the parts thereof according to the merging,
   until all the parts belong to a single group; and
   configuring the network by determining an arrangement of one or more intercepting elements according to the conditions of the inter-part connections.

2. The method according to claim 1, wherein said initializing a grouping of the sources and parts comprises:
creating a group for each source, the group comprising the source and each part directly connected thereto; and
merging the groups sharing a same source and/or a same part.

3. The method according to claim 1, wherein said initializing a grouping of the sources and parts comprises, for each group:
estimating a flow across each inter-part connection of the group; and
setting the estimated supply of each part of the group according to the sum of the flow of the corresponding inter-part connections entering the part.

4. The method according to claim 1, wherein said selecting an enlarging group comprises:
skipping each group having a highest supply energy among a supply energy of the sources of the group lower than a corresponding minimum supply energy required by all the under-supplied parts adjacent to the group.

5. The method according to claim 1, wherein said selecting an adding part comprises:
distributing the total demand of the enlarging group throughout the sources thereof;
calculating a residual capacity of each source of the enlarging group according to the difference between the capacity of the source and the total demand distributed thereto; and
selecting a matching pair among one or more candidate pairs formed by each source of the enlarging group and each under-supplied part adjacent to the enlarging group, the matching pair being selected according to a comparison between the residual capacity of the source and the residual demand of the under-supplied part of the candidate pairs.

6. The method according to claim 5, wherein said distributing the total demand of the enlarging group comprises:
estimating an outflow of each source of the enlarging group; and
distributing the total demand of the enlarging group to each source thereof according to the corresponding outflow.

7. The method according to claim 6, wherein said distributing the total demand of the enlarging group comprises:
estimating a stress of each inter-part connection of the enlarging group,
selecting, for each most stressed connection of the inter-part connections of the enlarging group whose stress is higher than a stress threshold, at least one relieving connection among the inter-part connections between the parts of the most stressed connection for reducing the stress thereof; and
setting each relieving connection to the open condition.

8. The method according to claim 5, wherein said selecting an adding part comprises:
selecting the adding part further in decreasing order of a matching of the corresponding minimum supply energy required by the under-supplied parts with the supply energy of the sources of the enlarging group.

9. The method according to claim 8, wherein said selecting an adding part comprises:
selecting the matching pair further according to a comparison between the supply energy of the source and the minimum supply energy required by the under-supplied part of the candidate pairs.

10. The method according to claim 5, wherein said merging the group of the adding part into the enlarging group comprises:
determining a lowest resistance path from the source of the matching pair to the adding part; and
setting the inter-part connection between the enlarging group and the adding part in the lowest resistance path to the open condition.

11. The method according to claim 1, wherein said updating the supply balance of the merged enlarging group and the residual demand of the parts thereof comprises:
estimating a flow across each inter-part connection of the merged enlarging group and setting the residual demand of each part thereof according to the difference between the sum of the flow of the corresponding inter-part connections entering the part and the total demand of the part.

12. The method according to claim 1, further comprising:
estimating a further stress of each inter-part connection of the network;
selecting, for each further most stressed connection of the inter-part connections of the network whose further stress is higher than a further stress threshold, at least one further relieving connection among the inter-part connections between the parts of the further most stressed connection for reducing the further stress thereof;
setting each further relieving connection to the open condition;
estimating a lowest supply pressure of the users of each part of the network;
selecting for each most deficient part of the parts of the network whose lowest supply pressure is lower that a corresponding minimum supply pressure required by the part, at least one improving connection among the inter-part connections between the most deficient part and each part adjacent to the most deficient part for increasing the lowest supply pressure thereof; and
setting each improving connection to the open condition.

13. The method according to claim 1, wherein the network is a water distribution network.

14. A computer program product comprising a non-transitory computer readable medium embodying a computer program configured to cause a computing system to perform, when the computer program is executed on the computing system, steps of:
providing a partition of the users into a plurality of disjoints parts each one comprising one or more inter-connected users, each inter-part connection between different parts being set to a closed condition;
initializing a grouping at least partial of the sources and parts into a plurality of disjoint groups each one comprising one or more interconnected sources and parts;
repeating:
selecting an enlarging group among the groups being over-supplied by having a residual capacity indicative of an excess of a supply balance thereof based on the difference between a total capacity of the corresponding sources and a total demand of the corresponding users, the enlarging group being selected in decreasing order of the residual capacity of the over-supplied groups,
selecting an adding part among the parts adjacent to the enlarging group being under-supplied by having a non-zero residual demand based on the difference between a total demand of the corresponding users and an estimated supply of the part by the sources, the adding part being selected in decreasing order of a matching of the residual demand of the under-supplied parts with the residual capacity of the enlarging group, merging the adding part into the enlarging group by setting at least one inter-part connection between the adding part and the enlarging group to an open condition, updating the supply balance of the merged enlarging group and the residual demand of the parts thereof according to the merging, until all the parts belong to a single group; and configuring the network by determining an arrangement of one or more intercepting elements according to the conditions of the inter-part connections.

15. A computing system comprising:

a processor and memory combined with the processor, wherein the memory has computing instructions stored therein that are configured to cause the computing system to perform, when the computing instructions are executed by the processor, steps of:

providing a partition of the users into a plurality of disjoints parts each one comprising one or more interconnected users, each inter-part connection between different parts being set to a closed condition;

initializing a grouping at least partial of the sources and parts into a plurality of disjoint groups each one comprising one or more interconnected sources and parts;

repeating:

selecting an enlarging group among the groups being over-supplied by having a residual capacity indicative of an excess of a supply balance thereof based on the difference between a total capacity of the corresponding sources and a total demand of the corresponding users, the enlarging group being selected in decreasing order of the residual capacity of the over-supplied groups, selecting an adding part among the parts adjacent to the enlarging group being under-supplied by having a non-zero residual demand based on the difference between a total demand of the corresponding users and an estimated supply of the part by the sources, the adding part being selected in decreasing order of a matching of the residual demand of the under-supplied parts with the residual capacity of the enlarging group, merging the adding part into the enlarging group by setting at least one inter-part connection between the adding part and the enlarging group to an open condition, updating the supply balance of the merged enlarging group and the residual demand of the parts thereof according to the merging, until all the parts belong to a single group; and configuring the network by determining an arrangement of one or more intercepting elements according to the conditions of the inter-part connections.

\* \* \* \* \*